United States Patent [19]

Jones et al.

[11] Patent Number: 4,633,246
[45] Date of Patent: Dec. 30, 1986

[54] TIME DIVISON MULTIPLEX RING

[75] Inventors: J. Richard Jones; Alan B. Mann, both of Raleigh, N.C.

[73] Assignee: FiberLAN, Inc., Raleigh, N.C.

[21] Appl. No.: 663,360

[22] Filed: Nov. 29, 1984

Related U.S. Application Data

[63] Continuation-in-part of Ser. No. 569,282, Jan. 9, 1984, abandoned.

[51] Int. Cl.$^4$ .............................................. H04Q 9/00
[52] U.S. Cl. ................................ 340/825.05; 370/16; 340/825.02
[58] Field of Search ....................... 340/825.05, 825.16, 340/825.02; 370/15, 16, 55, 65, 86, 87; 371/11

[56] References Cited

U.S. PATENT DOCUMENTS

| | | | |
|---|---|---|---|
| 4,159,470 | 6/1979 | Strojny et al. | 340/825.05 |
| 4,446,551 | 5/1984 | Seo | 340/825.05 |
| 4,519,070 | 5/1985 | Bell | 370/16 |
| 4,530,085 | 7/1985 | Hamada et al. | 370/15 |
| 4,538,264 | 8/1985 | Bahr et al. | 371/11 |
| 4,542,496 | 9/1985 | Takeyama et al. | 370/16 |

FOREIGN PATENT DOCUMENTS 2114858 8/1983 United Kingdom .................. 370/65

Primary Examiner—Donald J. Yusko
Attorney, Agent, or Firm—Roy B. Moffitt; J. David Abernethy

[57] ABSTRACT

A Time Divison Multiplex Ring (TDM Ring) comprising a plurality of nodes (central offices) connected together by interchange trunks (main and standby paths) in a ring type configuration. Each node contains a multiplexer, a demultiplexer, data, alarm, bridging, switching circuits, transmitters and receivers on the main and standby paths, all arranged so that (a) data and alarm signals are transmitted in a first direction on the main path and in an opposite direction on the standby path, (b) the bridging circuit forms a transmission path between the transmitter and receiver on the standby path of each node only in response to a predetermined alarm signal originating from an alarm circuit in another node received at a given node on the main transmission path and (c) the switching circuit is responsive to the presence of a predetermined alarm status to switch the data and alarm circuits at each node from a connection where all transmission is on the main path to a connnection whereby such signals are transmitted at least in part over the standby path.

10 Claims, 6 Drawing Figures

TIME DIVISON MULTIPLEX RING

CROSS-REFERENCE TO RELATED APPLICATIONS

This application is a continuation-in-part of application Ser. No. 569,282 filed Jan. 9, 1984 assigned to a common assignee and abandoned.

FIELD OF THE INVENTION

The present invention relates to a communications network, namely a Time Division Multiplex Ring (TDM Ring). More particularly the invention contemplates a plurality of nodes (central offices) connected together by means of transmission links (interchange trunks) in a ring type configuration. At each node, channels are either accessed or patched through as desired.

BACKGROUND OF THE INVENTION

It is general prior art practice, in connecting central offices or nodes via area exchange trunks, at any given node to drop and add circuits, access and patch circuits through to the next office or node. One way of accomplishing these functions is to use a so-called drop and insert configuration in which channel multiplexers are placed back to back and through channels patched through and dropped channels are made available.

In a ring network in which channels are added or dropped at each node of the ring, using the above described type of equipment, the state of the art approach is to use the drop/insert configuration. In order to insure that the transmission between nodes or central offices is reliable, a redundant transmission scheme is used employing a so-called 1×1 protection approach. Such an approach (see FIG. 1) contemplates that in each node, channels are dropped and inserted using back-to-back multiplexers with dropping and patching of channels as desired to serve the required capacity of the equipment located at each node. Outputs of each multiplexer/demultiplexer are transmitted through redundant paths by bridging the signal at the transmit end and selecting the best channel at the received end via a "protection" switch. Thus, failure of a transmitter or a receiver or a communications path between nodes will not result in an outage. However, a loss of both communications paths (due to a cable cut or other path interruption), between nodes will result in an outage. To protect against such an outage, an elaborate central control node is used, which controls protection switching and bypass mechanisms at each node. However, such implementations have reliability problems of their own due to the complexity of the control node.

Prior art ring networks for data and voice communication require costly equipment, are designed to minimize transmission band width and employ a large amount of equipment (back-to-back multiplexers in a drop/insert configuration). A communication system using less equipment which would not result in an outage if an entire cable were cut (without the use of a central control node) would represent a significant step forward in the art. It is towards these ends that the present invention is addressed.

BRIEF DESCRIPTION OF THE INVENTION

FIG. 2 discloses the basic elements of the present invention (a TDM ring) in their desired configuration (an implementation using fiber optic cable to connect the nodes is shown). Some equipment commonality exists between the invention and prior art circuits, namely a multiplexer/demultiplexer with a 1×1 transmission system. Apart from these common points, the present invention departs from the prior art (a) in the way that the communications paths are connected between the nodes and (b) the means by which the channel drop/insert function is accomplished. Arising out of these points of novelty is a system (a) providing the same number of signals to each node, (b) employing one-half the number of multiplexers and demultiplexers prior art systems use at all nodes (central offices), (c) requiring one-half the number of prior art communications paths between nodes, and (d) when communications paths are lost (assuming route diversity), no outages are experienced (accomplished without a central control node).

Briefly stated the novel communications network operates as follows: The basic components of the system are the nodes (multiplexer/demultiplexer, alarm, switching means and data source), connected together by a main and standby transmission circuit. At each node, each main and standby circuit has a transmitter and receiver. Irrespective of the status of the circuit, i.e., presence of faults or no faults, redundant data signals are transmitted in opposite directions around the ring. Channels to be dropped at each node are dropped as in prior art devices. Channels that are to be patched through are "looped back" within the node and transmitted to the next node. In the event of a failure of a transmitter or receiver or fiber, the transmission system redundancy prevents an outage (the affected receiver switches to the backup receiver and data is received from a direction opposite from that which it was previously transmitted prior to the fault occurring). This gives the system an advantage over the prior art because in the event of a cable cut (given route diversity), there is no service outage at any node. A cable cut in the prior art system would result in degraded service to that node affected by the cable cut. In each node there is a bridging means adapted to form a transmission path between the transmitter and receiver on the standby transmission path of each station, responsive to a predetermined alarm signal originating from an alarm means at another station and received at a given station only on the main transmission path. Such bridging means causes a loop back circuit on the standby path to form a path over which redundant data can be transmitted, thereby avoiding an outage.

A TDM ring offers the following advantages over the prior art back-to-back and drop/insert multiplex/demultiplex approach:

(1) One-half of the number of multiplexers per intermediate node as required, i.e., one per node as opposed to two per node as with the prior art.
(2) One-half the number of communications paths between nodes is required, i.e., two fibers between nodes as opposed to four fibers between nodes for physical ring approach as per the prior art.
(3) One-half the transmission equipment per intermediate node is required, i.e., two transmitters and two receivers per node as opposed to four transmitters and four receivers as with the prior art.

The above stated advantages are accomplished without sacrificing reliability or reducing the number of channels connected to each node.

The concept of a redundant ring system is not new. Applicants are aware of currently used products that incorporate the concept of a redundant ring system. However, in the prior art circuits, switching is under the control of a central station for the entire network, rather than under individual node control as is the case in the disclosed TDM ring (centralized control vs. distributed control). Additionally, the entire prior art ring switched at one time rather than switching an individual path basis as is the case in the present invention.

PRIOR ART DROP/INSERT TRANSMISSION SYSTEMS

Figure 1:
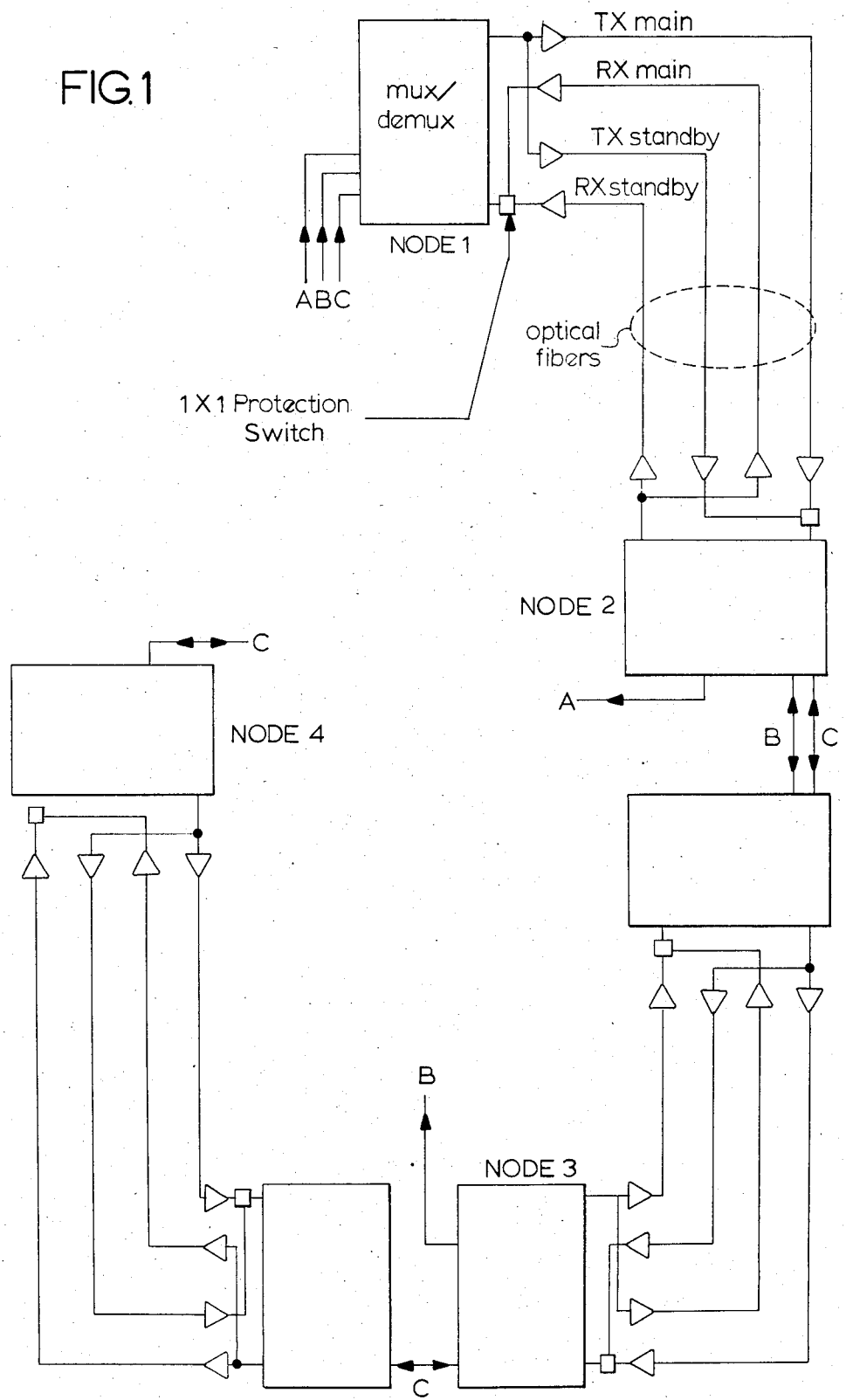
FIG. 1 is a schematic representative of a conventional drop/insert circuit.

FIG. 1 is a schematic representation of a conventional drop/insert circuit approach. More particularly it is a block diagram describing point-to-point connections, namely node 1 to nodes 2, 3 and 4. The multiplexer/demultiplexer equipment located at each node could be a type M13 manufactured by Rockwell International Corporation (Collins Transmission Division) with protected optical fiber interfaces. In such a circuit, to implement point-to-point connections from node 1 to each other node, the signal flow is as follows: channel A equals node 1 to node 2 signal(s); channel B equals node 1 to node 3 signal(s); and channel C equals node 1 to node 4 signal(s). Signal paths are as follows: channels A, B and C originated at node 1. They are multiplexed into a single data stream at node 1 for transmission to the other nodes. At node 2, all channels are demultiplexed. Channel A is dropped to provide node 1 to node 2 communications path, channels B and C are patched through to provide communications to down stream nodes (3 and 4). At node 3, all channels are demultiplexed and channel B is dropped to provide node 1 to node 3 communications. Channel C is patched through to provide communications to down stream node 4. At node 4, all channels are demultiplexed and channel C is dropped to provide node 1 to node 4 communications path.

Protection is achieved by providing redundant paths between each node. If a problem occurs in the main path, traffic is automatically switched to the standby path thereby maintaining the signal integrity between nodes. However, if an entire node is lost, signal paths are lost to all downstream nodes.

A node 4 to node 1 connection could be provided to close the system and form a ring and provide the redundancy to allow additional signal paths for node bypasses to solve the problem mentioned above. Manual patching is required in each surviving node to implement bypass. It is known to drop and insert channels at an intermediate repeater office (a node) using Rockwell International Corporation type M13 multiplexers. The multiplexers are connected back-to-back, the local channels are dropped and/or inserted. Through channels are normally connected at the DS2 (digital signal 2 level) using the DS2 asynchronous interface option. Interconnect at the DS2 level is preferred because of its relative low cost and high reliability. Through-channels could, however, also be connected at the DS1 or at DS1C level.

DETAILED DESCRIPTION OF THE INVENTION

The TDM ring is a drop/insert multiplex system using a ring topology for point to point or broadcast connections between mutliple nodes. It uses conventional telco-type multiplex and transmission equipment to implement a DS1 or a DS0-based local area network. The TDM ring employs standard DS1 or DS0 interfaces (DS2, DS1C or other standard interfaces can be used) and can transmit any combination of voice and data and encoded video signals using prior art available equipment such as channel bank, data multiplexer, video codec, etc.

Figure 2:
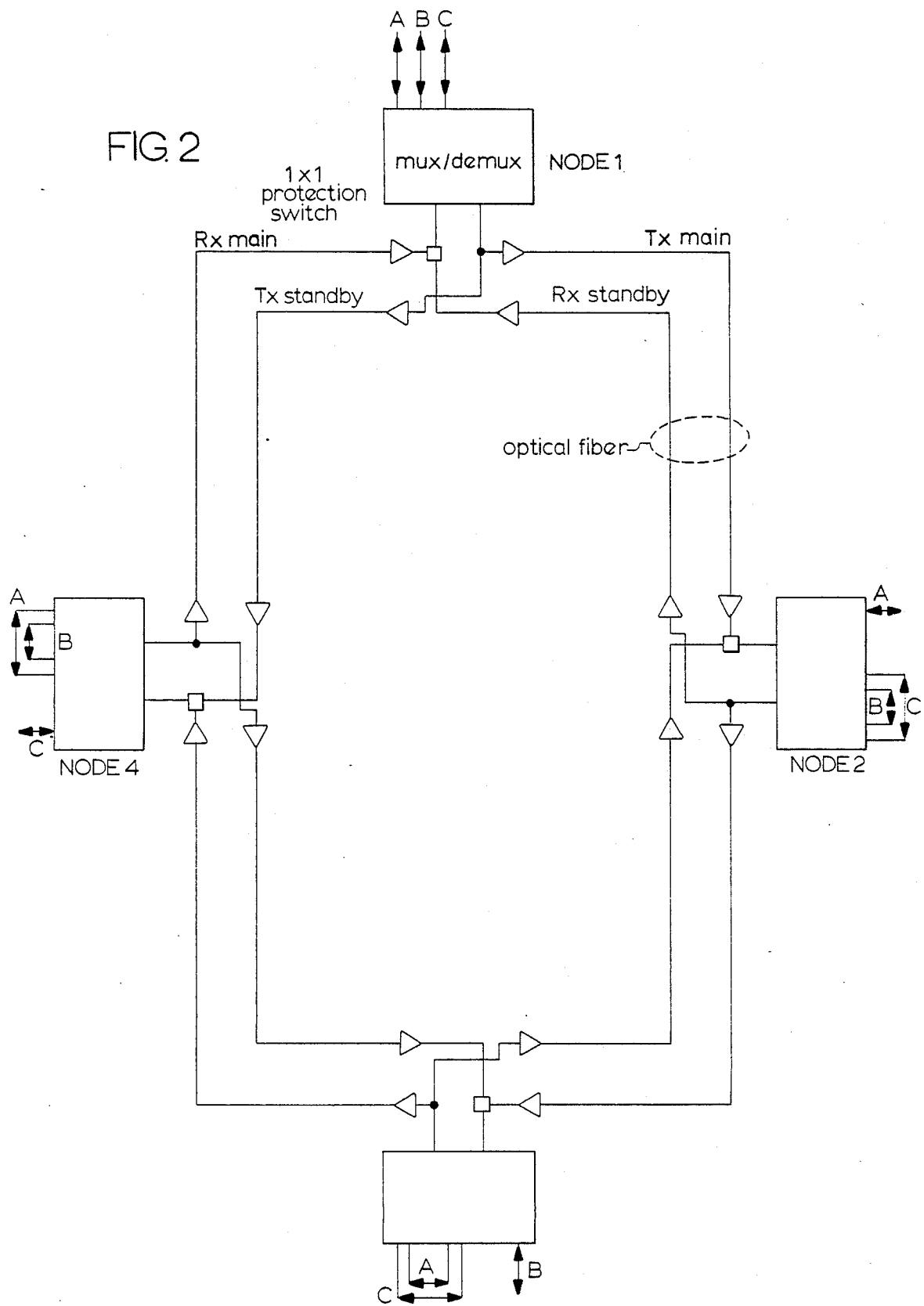
FIG. 2 is a schematic representation of a TDM ring circuit.

Referring to FIG. 2, there is shown a block diagram for TDM ring point-to-point connections from node 1 to each other node. At each node there is multiplexing and demultiplexing equipment, which is similar to that used in the prior art drop/insert system except only one multiplexer/demultiplexer is employed per node. The protected optical interfaces have been connected differently, however. Rather than connecting main and standby paths in a parallel node-to-node configuration, they are connected in opposite direction rings, i.e., the main is connected as a clockwise ring and the standby as a counter-clockwise ring, the term clockwise and counter-clockwise refer to the direction of data flow around the ring.

With respect to the TDM ring as shown in FIG. 2, channel assignments are: Channel A equals node 1 to node 2 signal(s), Channel B equals node 1 to node 3 signal(s), and Channel 3 equals to node 1 to node 4 signal(s).

Signal paths for the above-identified channels are: Channels A, B and C originate at node 1. They are multiplexed into a single data stream for transmission to other nodes. At node 2, all signals are demultiplexed. Channel A is dropped to provide node 1–node 2 communications path, Channel B and C are looped back (multiplex/demultiplex output connected to input) to provide communications to the other nodes in the ring. At node 3, all signals are demultiplexed. Channel B is dropped to provide node 1–node 3 communications path, Channels A and C are looped back to provide communications to the other nodes in the ring. At node 4, all signals are demultiplexed. Channel C is dropped to provide node 1–node 4 communications path, Channels A and B are looped back to provide communications to the other nodes in the ring.

Reading the above description in combination with FIG. 2, it is obvious that the signals pass from node-to-node in a "daisy chain" fashion with the appropriate or desired channels dropped at each node and the remaining channels patched through to subsequent nodes in the ring.

TDM RING—TRANSMISSION LINE PROTECTION

Transmission line protection is different in the TDM ring as opposed to prior art circuits because alarm interpretation and loop back functions must be implemented to bring about node bypasses and signal re-routing functions so as to maintain node communications integrity. Novel alarm interpretation/transmission and loop back rules must be followed in order to implement protection of the transmission path in the TDM ring circuit. These are as follows:

1. The identity of the main and standby paths must be maintained.
2. A distinction must be made between (a) local alarms and (b) remote alarms transmitted from an upstream node, usually via overhead bits in the multiplexed data stream. A further distinction must be made between local alarms on the main and alarms on the standby paths. Local alarms on the main path are sent on to the subsequent node (remoted) whereas local alarms on the standby paths are not.
3. Remote alarms received via the main path are repeated on the main path to downstream nodes.
4. Remote alarms received on the standby path are not repeated to downstream nodes.
5. All nodes that receive a remote alarm indication on the main path only must loop back on the standby path (e.g., connect standby receiver output to standby transmitter input, thereby bypassing the node in the standby path).
6. Any node that receives a remote alarm indications on both the main and standby paths does not loop back.
7. Nodes that have local alarms on the main or standby receiver do not loop back.
8. All transmission system alarms that cause switching from main to standby must be receiver alarms. Transmitter alarms must not cause switching at the transmit end. All switching must be done at the received end (node).

ILLUSTRATION OF TRANSMISSION LINE PROTECTION—TDM RING

To illustrate the operation of the protection system for the TDM ring, three examples are hereinafter described, namely, (1) failure of a transmitter or fiber or receiver in the main path; (2) a cable cut between nodes; and (3) loss of a node.

Figure 3:
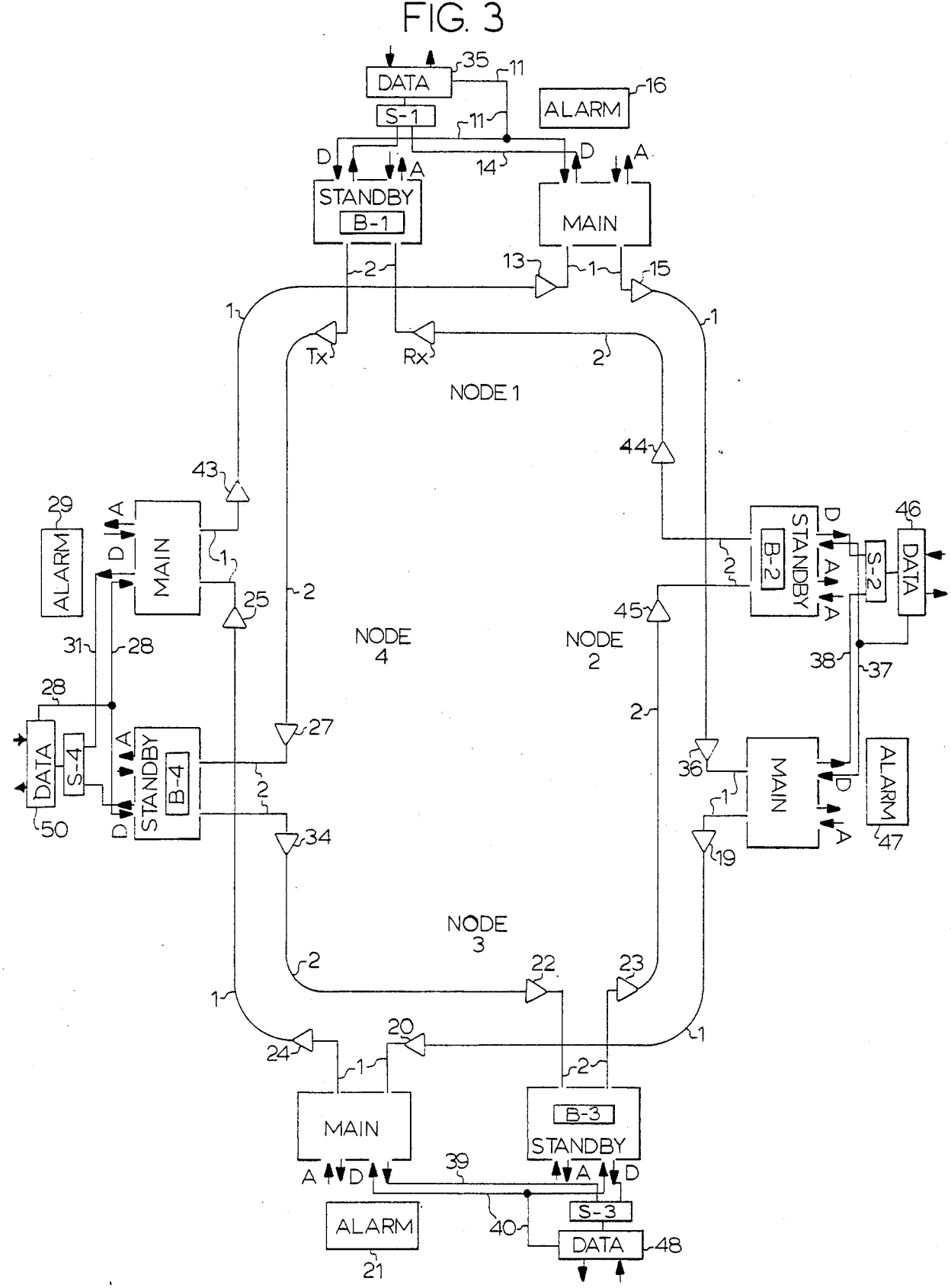
FIG. 3 is a schematic representation of a TDM ring-normal operation.

Prior to describing the three examples set forth above, reference is made to FIG. 3 showing a TDM ring in normal operation, i.e., there being no faults or malfunctions in the system. If there are no malfunctions occurring, the TDM operates as follows:

TDM RING—NORMAL OPERATION

Reference is made to FIG. 3. None of the alarms 16, 47, 21 or 29 are operative; therefore, none of the STANDBY transmitters and receivers are looped together, i.e., transmitter and receivers Tx and Rx; 44 and 45; 22 and 23; 27 and 34; are not joined together. Since the alarms are not activated by a malfunction or a signal from another alarm system, no alarm signals flow through the system. Data flows from node 1 from data source 35 as follows: on lead 11 through the MAIN of node 1 on to lead 1 through transmitter 15 down lead 1 to receiver 36 onto lead 38 via switch S-2 into data source 46 of node 2, where channels are accessed or patched through as desired. Outflow from data source 46 is over lead 37 through the MAIN of node 2 through transmitter 19, over lead 1 to receiver 20 on lead 1 into the MAIN of node 3, over lead 39 via switch S-3 to data source 48 and out of data source 48 on lead 40, through MAIN of node 3, lead 1 through transmitter 24 back onto lead 1. In node 3 channels are accessed or patched through as desired. Data continues over transmission path 1 through transmitter 24 over lead 1 to receiver 25 into the MAIN of node 4 on lead 1, thence over lead 31 via siwtch S-4 to data source 50 (where channels are accessed or patched through as desired) and out of data source 50 on lead 28 through the MAIN of node 4, then though transmitter 43 over lead 1 to receiver 13, lead 1 into the MAIN of node 1, onto lead 14 via switch S-1 into the original data source 35. Multiple numbers of channels are transmitted around the ring with some fraction of the total number being accessed at each node. Those not accessed are patched through. A different fraction of the total is accessed at each node.

At each node, transmit data is bridged for output on both main (lead 1) and standby (lead 2). For example, at node 2, output from data source 46 is transmitted (bridged) by both transmitter 19 (main) and transmitter 44 (standby). The data from transmitter 44 is transmitted over lead 2 to the receiver Rx at node 1. In normal operation, that path is not active due to the fact that the output from note 1 standby receiver is not connected to the data source (35) by switch S-1. The same is true at each other node in the ring.

Said differently, in normal operation, the output signal from each main transmitter (15, 19, 24, 43) and standby transmitter (Tx, 34, 23, 44) are the same. Data signals are bridged to allow redundant transmission. Thus receiver 27 (node 4) and receiver 36 (node 2) are receiving the same data. Receiver 27 is "off line." Only receiver 25 is connected to data source 46. If a failure occurs in the main path, the node equipment attempts to switch to the standby path in order to take advantage of the redundant transmit paths. For example, if receiver 25 fails, node 4 switches to receiver 27. But, receiver 27 contains the wrong data stream. It is coming from node 1, while the "right" data stream is coming from node 3. In order for this inherent protection switching mechanism to work, an alternate path must be established in order to allow the right data to get to node 4. How the path is established is illustrated in the subsequent examples.

Figure 4:
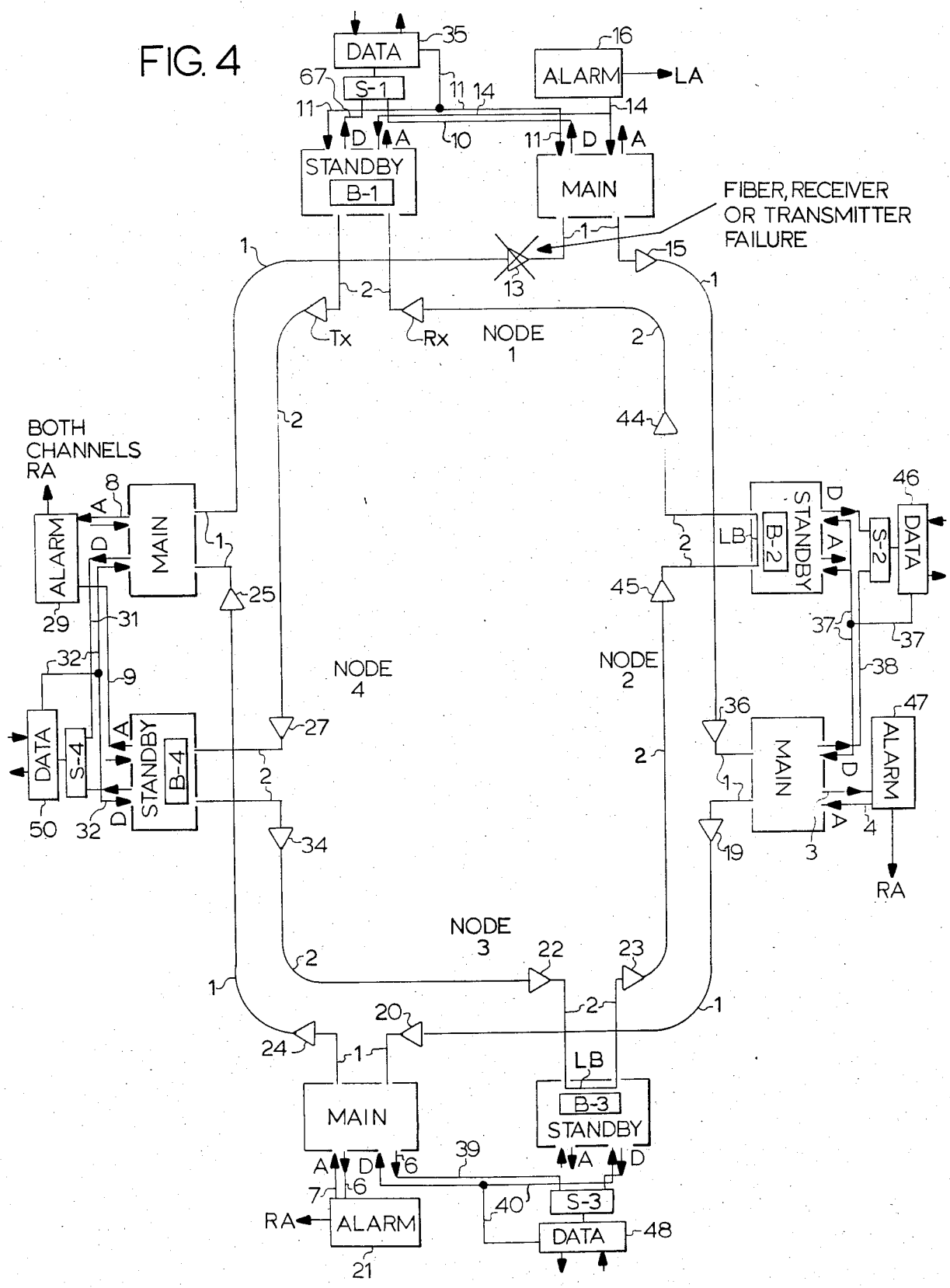
FIG. 4 is a schematic representation of a TDM ring where there is a failure of a transmitter, receiver or fiber.

Failure of Transmitter, Receiver or Fiber—Refer to FIG. 4

Assuming receiver 13, fiber lead 1, or transmitter 43 malfunctions, the circuits are as follows:

Since all alarm conditions are perceived at a receiver, a transmitter, fiber or receiver failure causes the same indication: a receiver alarm.

Beginning at node 1, alarm 16 is activated because of malfunction indicated at receiver 13. It acts as a local alarm because of malfunction nature and location (immediately upstream from alarm 16). The alarm signal from local alarm 16 goes out over lead 14, then on lead 1 to transmitter 15, over lead 1 through receiver 36 and lead 1 into the "MAIN" of node 2, over lead 3 into alarm system 47, where it is perceived as a remote alarm. Alarm system 47, activated by this remote alarm signal from alarm 16, causes a standby circuit LB to be looped through B-2, i.e., standby transmitter 44 connected directly to standby receiver 45 because there is no alarm on standby or no local alarm. Alarm 47 then sends out a signal over lead 4 through lead 1, transmitter 19 over lead 1 through receiver 20, over leads 1 and 6 into alarm 21. Alarm 21 (remote alarm) is responsive thereto causing loopback (LB) through B-3 on the standby path (e.g., connecting receiver 22 to transmitter 23). In addition, it repeats the remote alarm indication and sends the signal over lead 7. As noted, the remote alarm at alarm 21 causes the same condition in node 3 with regards to standby circuit as in node 2, i.e., receiver 22 to be connected to transmitter 23. Alarm 21 having been activated by remote alarm signal from alarm 47 sends out a signal over leads 7 and 1, via transmitter 24 over lead 1 to receiver 25 via lead 1 into the MAIN of node 4. The signal continues over lead 8 to alarm 29 where a remote alarm indication is noted. Back at node 1, the alarm signal from local alarm 16 (in addition to traveling on the main path as described above) goes along lead 14 and lead 2 through transmitter Tx and receiver 27 to the standby circuit of node 4. Node 4 has received both alarm signals, both are remote alarm signals, one on the STANDBY and one on the MAIN. The alarm signal path is completed through leads 8 and 9 into alarm 29. Because there are alarms on both STANDBY and MAIN, there is no loopback at node 4.

The data circuit is as follows: data from data source 35 flows on lead 11, through lead 1, transmitter 15 over lead 1 into receiver 36 via lead 1 into node 2, into data source 46 via lead 38 and switch S-2 (where channels are accessed or patched through as desired), out of data source 46 on lead 37 through lead 1, transmitter 19 over lead 1 through receiver 20, lead 1, over lead 39 through switch S-3 to data source 48 (where channels are accessed or patched through as desired), thence over lead 40, lead 1, to transmitter 24, thence over lead 1 to receiver 25, on lead 1, into the MAIN of node 4, over lead 31 through switch S-4 into data source 50 (where channels are accessed or patched through as desired), out lead 32 over lead 2 through transmitter 34 over lead 2, through receiver 22, lead 2, loopback (LB) via lead 2 to transmitter 23 through B-3, then over lead 2 to receiver 45, lead 2, loopback (LB) via lead 2 to transmitter 44 through B-2, then over lead 2 to receiver Rx lead 2 back to the node 1 data source 35 via lead 67 and switch S-1.

Figure 5:
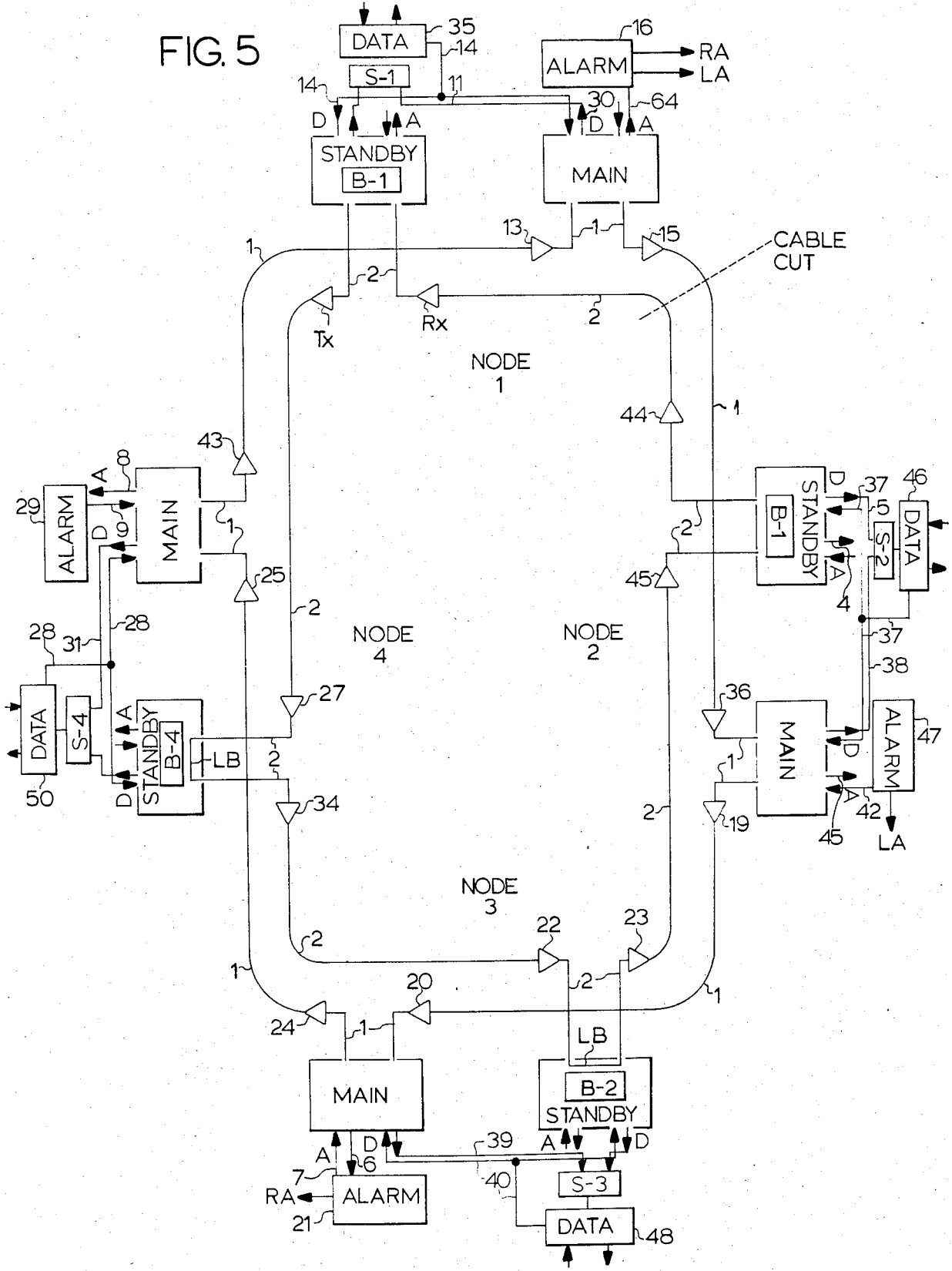
FIG. 5 is a schematic representation of a TDM ring where there is a cable cut.

TDM Ring—Cable Cut—Refer to FIG. 5

The TDM ring has both its main and standby paths between node 1 and node 2 (leads 1 and 2) cut. Alarm 47 of node 2, being downstream from the cable cut (lead 1) is responsive thereto. Due to loss of signal at receiver 36 alarm 47 responds as a local alarm because the alarm (loss of signal) is detected locally at node 2. Likewise, alarm 16 of node 1, being downstream from the cable cut (lead 2), also acts as a local alarm. Note however that the alarm at node 2 is on the main path (lead 1) whereas the alarm at node 1 is on the standby path (lead 2). Local alarm 47 sends a signal (termed a remote alarm indication) over lead 42 through lead 1 to transmitter 19 over lead 1 to receiver 20 and over lead 1 into the MAIN of node 3, over lead 6 into alarm 21. Alarm 21 is responsive to this remote alarm signal from alarm 47 causing transmitter and receiver 22 and 23 respectively to be connected (looped back) through B-2 (see element LB) because only the remote alarm signal from alarm 47 was received on the MAIN in node 3. Alarm 21 now repeats the remote alarm indication (which originated at alarm 47), transmitting it over leads 7 and 1, through transmitter 24, lead 1, receiver 25, lead 1 then into the MAIN of node 4, through lead 8 into alarm 29 which causes a loopback (LB) in the STANDBY portion of node 4 to form, as was the case in node 3. This loopback connects receiver 27 and transmitter 34 through B-4. Alarm 29 of node 4 repeats the remote alarm signal transmitting it over leads 9 and 1 through transmitter 43, over lead 1 through receiver 13 via lead 1 into the MAIN of node 1. This remote alarm signal completes its circuit through lead 64 and alarm 16 of node 1. Since node 1 has already received a local alarm indication from the standby receiver (as mentioned above), alarm 16 has both a local alarm and remote alarm indicated. The presence of the local alarm causes the remote alarm to be ignored, therefore, the loopback (LB) on the standby path is not activated.

As a result of the reaction of each node to the alarm indications, (loopback or no loopback on standby) the data signal has the following circuit path: data from data source 35 flows down lead 14 through lead 2 to Tx over lead 2 through receiver 27 via lead 2 through the node 4 loopback (LB) path via lead 2 through transmitter 34 over lead 2 through receiver 22, through lead 2 to loopback (LB) of node 3 via lead 2 through transmitter 23 over lead 2 through receiver 45 over lead 2 into the STANDBY of node 2, through lead 5 and switch S-2 into the data source 46 of node 2 (where channels are accessed or patched through as desired), out lead 37 via lead 1 into transmitter 19 over lead 1 and through receiver 20 via lead 1 to the MAIN of node 3, over lead 39 through switch S-3 into the data source 48 of node 3, (where channels are accessed or patched through as desired), out of the data source 48 over lead 40 via lead 1 into transmitter 24, onto lead 1 into receiver 25, onto lead 31 through switch S-4 into the data source 50 of node 4 (where channels are accessed or patched through as desired), out of data source 50 on lead 28 via lead 1 to transmitter 43, lead 1, receiver 13, lead 1 and over lead 11 into the data source 35 via switch S-1 of node 1 to complete the path. In spite of the cable cut, all nodes are able to continue to communicate with each other; no communication paths are lost.

Figure 6:
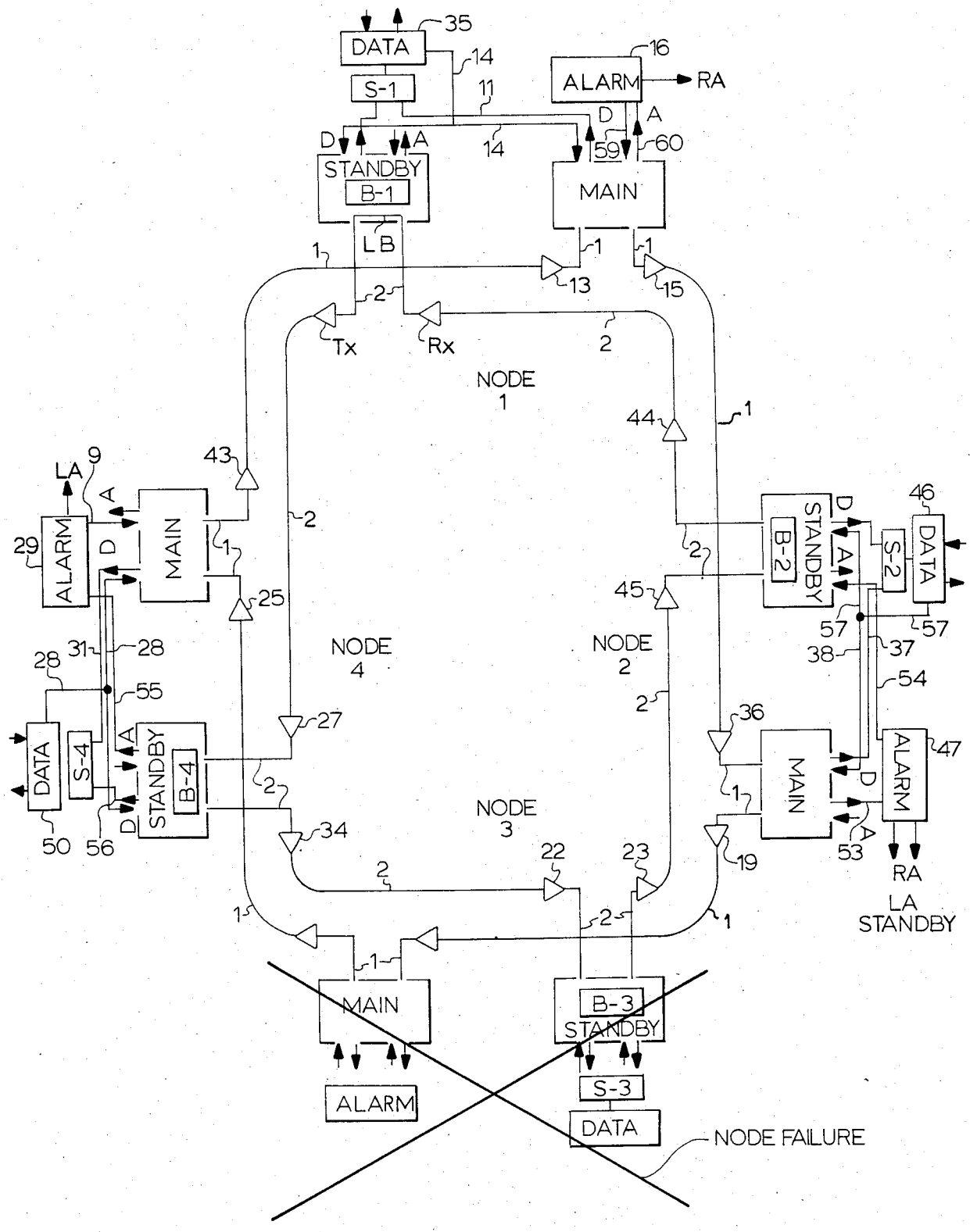
FIG. 6 is a schematic representation of a TDM ring circuit where there is a loss of node.

TDM Ring-Loss of Node—Refer to FIG. 6

It is assumed that node 3 goes out in its entirety. Since node 4 is downstream from node 3 on the MAIN (lead 1), the alarm at node 4 is in the local alarm mode (main). Likewise, since node 2 is downstream (on the standby circuit from node 3), alarm 47 of node 2 is also in the local alarm mode (standby). Alarm 29 of node 4 sends out a remote alarm signal to node 1, which is received on the main transmission line 1 thereby causing a loopback (LB) between Tx and Rx through B-1. Alarm signal from remote alarm 16 of node 1 is transmitted in the remote alarm mode to node 2 on the MAIN. At node 2 remote alarm is received on the main but the standby channel has a local alarm; therefore, no loopback between transmitter 44 and receiver 45.

The alarm circuit is as follows: Beginning with alarm 29, the transmitted remote alarm signal passes through lead 9 via lead 1 to transmitter 43, via lead 1 through receiver 13, onto lead 1 into the MAIN of node 1, onto lead 60 to activate alarm 16. Alarm 16 receives the remote alarm and repeats the remote alarm signal on lead 59 to lead 1 through transmitter 15, on lead 1, through receiver 36 into the MAIN of node 2 onto lead 53 to alarm 47, which indicates a remote alarm since it has received a remote alarm on the MAIN transmission path. However, a local alarm on the standby path prevents loopback on standby. Alarm 47 sends out an alarm signal on lead 54 onto lead 2 through transmitter 44 to receiver Rx via lead 2 through loopback (LB) of node 1, via lead 2 through transmitter Tx to receiver 27 into the STANDBY of node 4 via lead 2, through lead 55 into alarm 29 to complete the circuit.

The data circuit is as follows: Data source 35 sends signals through lead 14 onto lead 1 through transmitter 15 onto lead 1 through receiver 36, lead 1 through main of node 2 onto lead 37 through switch S-2 to data source 46, where channels are accessed or patched through, as desired. Data flows out of data source 46 onto lead 57 via lead 2 through transmitter 44, lead 2, receiver Rx, loopback (LB) of node 1 (via B-1), via lead 2 through transmitter Tx onto lead 2 through receiver 27 via lead 2 into standby of node 4, onto lead 56 through switch S-4 into data source 50, at which point channels are accessed or patched through, as desired. Data then flows via lead 28 via lead 1 through transmitter 43, on lead 1 through receiver 13, on lead 1 to the main of node 1, to lead 11, through switch S-1 back to data source 35.

The loss of node 3 results in communication channels to and from node 3 being lost. The system allows the other 3 nodes to retain communications integrity.

Located in each node is a switching means S-1, S-2, S-3 and S-4 for nodes 1, 2, 3, and 4 respectively, each individual switch is responsive to the various alarm signal combinations and/or the absence of same as described for the TDM ring circuit under the headings of (1) Normal Operations, (2) Failure of Tx, Rx or Fiber and (3) Cable Cut, (4) Loss of Node. For each alarm combination and/or absence of same as previously described, switches S-1, S-2, S-3 and S-4 are responsive thereto to switch the circuit in the node from that condition (circuit configuration) shown in FIG. 3 (Normal Operation) to those circuit configurations shown in FIG. 4, 5 and 6 (Failure of Tx, Rx or Fiber; Cable Cut; and Loss of Node) and back again to Normal Operation (FIG. 3) as the alarm conditions (local and remote) occur at that node.

Referring to FIG. 4 and the explanation thereof, S-1 is responsive to local alarm condition of alarm 16 to cause the circuit shown (main and standby): S-1 has switched so as to connect receiver Rx to the data source 35 instead of receiver 13. The other switches (S-2, S-3, S-4) are not activated. A similar explanation is applicable for the same switches but for different alarm conditions for the conditions at each node for the examples exemplified by FIGS. 5 and 6.

Located in the standby circuit of each node is a bridging means B-1, B-2, B-3 and B-4 for nodes 1, 2, 3 and 4 respectively, for forming a transmission path between the transmitter and receiver (Tx and Rx; 44 and 45; 22 and 23 and 27 and 34) on the standby transmission path of any given node. Each such bridging means is responsive to a predetermined alarm originating from an alarm means in another node and received at that node on the main transmission path.

What is claimed is:

1. A ring type data communications network comprising:
    (a) at least three nodes, each node containing a multiplexer and a demultiplexer, a means to transmit data and an alarm means for transmitting alarm signals;
    (b) main and standby transmission paths connecting said nodes into a ring type transmission circuit;
    (c) a first transmitter and receiver at each node in the main transmission path adapted to transmit and receive data and alarm signals in a first direction;
    (d) a second transmitter and receiver at each node in the standby path normally unbridged one to another, adapted to transmit and receive data and alarm signals in a second direction opposite from said first direction;
    (e) a bridging means in each node for forming a transmission path between the transmitter and receiver on the standby transmission path of each node responsive only to a first predetermined alarm signal originating from the alarm means in the node containing said bridging means;
    (f) at least one switching means at each node responsive to the presence of a second predetermined alarm signal to switch the data and alarm means at each node from a connection where all transmission is utilized from the main transmission path to a connection whereby data and alarm signals are utilized from said standby path; and
    (g) a multiplexer at each node to multiplex transmissions and a demultiplexer to demultiplex receptions.

2. The ring type communications network of claim 1 wherein each of said alarm means is responsive to a circuit malfunction in the main incoming transmission path to cause a remote alarm signal to be transmitted by the node's standby and main transmitters.

3. The ring type communications network of claim 2 wherein each of said alarms is responsive to a remote alarm signal received via the main transmission path to re-transmit said alarm signal on said main path to the next downstream node.

4. The ring type communications network of claim 2 wherein said bridging means in a given node is non-responsive in the presence of remote alarm signals received on both the main and standby paths in said node.

5. The ring type communications network of claim 2 wherein said bridging means in a given node is non-responsive in the presence of a local alarm condition when received on either main or standby circuits in said node.

6. The ring type communications network of claim 2 wherein the alarm in a given node is non-responsive to remote alarms when received on the standby transmission path.

7. The ring type communications network of claim 3 wherein each of said alarms is responsive to a remote alarm signal received via the main transmission path to re-transmit said alarm signal only on said main path to the next downstream node.

8. A ring communications network, comprising: main and standby oppositely directed, looped unidirectional transmission paths having at least three nodes connected in series along said transmission paths, each node connected to each said transmission path, each node comprising:
    (a) a main transmitter and receiver adapted to transmit and receive, respectively, data and alarms on said main transmission path;
    (b) a standby transmitter and receiver adapted to transmit and receive, respectively, data and alarms on said standby transmission path;
    (c) a data source having an incoming signal path from a switch and having first and second outgoing signal paths, the first outgoing signal path connected to said main transmitter and the second outgoing signal path connected to a bridging means;
    (d) said switch, having an incoming signal path from said standby receiver and an incoming signal path from said main receiver, and having an outgoing signal path to said data source, adapted to connect said data source to said main receiver during normal operation and connect said data source to said standby receiver in response to a local alarm signal received from an alarm unit;

(e) said bridging means, having an outgoing signal path to said standby transmitter and having a normally connected incoming signal path from said data source, adapted to disconnect said data source signal path and connect an incoming signal path from said standby receiver in response to a bypass signal received from said alarm unit; and (f) an alarm unit adapted to transmit
   (i) a local alarm to said switch within the same node when data is not properly received on said main receiver;
   (ii) remote alarms on said main and standby transmitters when data is not properly received on said main receiver;
   (iii) a bypass signal to said bridging means within the same node in response to a remote alarm signal received by said main receiver when no other local or remote alarms are received at the node; and
   (iv) a remote alarm on said main transmiid main receiver when no other local or remote alarms are received at the node; and
   (iv) a remote alarm on said main transmitter when a remote alarm is received on said main receiver.

9. A method of operating a node in a ring communications network comprising main and standby oppositely directed, looped, unidirectional transmission paths having at least 3 nodes, each node connected in series along each said transmission path, comprising the steps of:

(a) detecting faults in data received on the incoming transmission paths;

(b) utilizing data received on the standby transmission path when a fault is detected on the main incoming transmission path, and utilizing data received on the main transmission path on other occasions;

(c) transmitting an alarm on said main and standby transmission paths when a fault is detected in data received on said main incoming transmission path;

(d) transmitting an alarm on the main transmission path when an alarm is received on the main transmission path;

(e) repeating data received on the incoming standby transmission path over the outgoing standby transmission path when (i) an alarm is received on the main transmission path, but not the standby transmission path, and (ii) no faults are detected on said standby transmission path;

(f) transmitting data over the main transmission path; and (g) transmitting data over the standby transmission path when said repeating step is not carried out.

10. A method as recited in claim 9 and further comprising the steps of:
(a) demultiplexing transmissions received; and
(b) multiplexing signals transmitted.

* * * * *

UNITED STATES PATENT OFFICE
CERTIFICATE OF CORRECTION

Patent No. 4,633,246            Dated December 30, 1986

Inventor(s) J. Richard Jones and Alan B. Mann

It is certified that error appears in the above-identified patent and that said Letters Patent are hereby corrected as shown below:

Column 11, lines 23 to 25, delete

"(iv) a remote alarm on said main transmiid main
    receiver when no other local or remote alarms
    are received at the node; and "

Signed and Sealed this

Tenth Day of March, 1987

*Attest:*

DONALD J. QUIGG

*Attesting Officer*      *Commissioner of Patents and Trademarks*